United States Patent [19]

Yana

[11] Patent Number: 4,505,603
[45] Date of Patent: Mar. 19, 1985

[54] THERMAL TRANSFER COLOR PRINTER AND A METHOD RELATING THERETO

[75] Inventor: Masasumi Yana, Yokohama, Japan

[73] Assignee: Tokyo Shibaura Denki Kabushiki Kaisha, Kanagawa, Japan

[21] Appl. No.: 466,046

[22] Filed: Feb. 14, 1983

[30] Foreign Application Priority Data

Feb. 16, 1982 [JP] Japan .................................. 57-22144

[51] Int. Cl.³ ................................................ B41J 3/02
[52] U.S. Cl. ............................ 400/120; 346/76 PH; 219/216; 400/240.3
[58] Field of Search ............... 400/120, 240.3, 240.4, 400/240, 201; 346/76 PH; 219/216 PH

[56] References Cited

U.S. PATENT DOCUMENTS

| | | | |
|---|---|---|---|
| 3,984,809 | 10/1976 | Dertouzos | 400/120 X |
| 3,988,744 | 10/1976 | Noda | 400/120 X |
| 4,030,588 | 6/1977 | Hanagata et al. | 400/120 |
| 4,378,566 | 3/1983 | Tsukamura | 400/120 X |
| 4,401,390 | 8/1983 | Mellisa et al. | 400/240.3 |

FOREIGN PATENT DOCUMENTS

| | | | |
|---|---|---|---|
| 3027912 | 2/1981 | Fed. Rep. of Germany | 400/120 |
| 154193 | 12/1980 | Japan | 400/240.3 |
| 75877 | 6/1981 | Japan | 400/120 |
| 115279 | 9/1981 | Japan | 400/120 |
| 18276 | 1/1982 | Japan | 400/120 |
| 2054470 | 2/1981 | United Kingdom | 400/120 |

OTHER PUBLICATIONS

"Color Thermal Transfer Printing", IBM Technical Disclosure Bulletin, vol. 23, No. 7A, 12/80, pp. 2633-2634.
"Thermal Ink Transfer Color Print", IBM Technical Disclosure Bulletin, vol. 23, No. 7A, 12/80, p. 2954.
"Multi-color Printing", IBM Technical Disclosure Bulletin, vol. 22, No. 7, 12/79, pp. 2633-2635.

Primary Examiner—E. H. Eickholt
Attorney, Agent, or Firm—Banner, Birch, McKie & Beckett

[57] ABSTRACT

According to the invention, a printer includes an elongated thermal printhead and a carrier drive means for transporting a multi-color ink carrier in a first direction and a medium drive means for transporting a record medium, in the same direction and rate, contiguously over the head. The printhead has a row of thermal elements, each of which may be energized to transfer a particular color ink onto the medium as the carrier sheet moves over the head. Various transferable color inks form areas which are arranged in equal color lengths along the length of the carrier sheet. Each respective color area extends transversely along the width of the sheet and are alternately and successively arranged along the length of the carrier sheet. The printhead is selectively forced into contact with the carrier sheet and record medium as they advance at the same rate by means of the carrier and record drive means. The record drive means also transports the record medium sheet in a second direction, opposite to the first direction, one color length while the printhead is disengaged from the carrier and record medium. This permits superimposing of color patterns for creating greater color hues and color ranges. The movement of the record medium in the second direction occurs at a higher rate than the transportation of the record medium in the first direction.

14 Claims, 14 Drawing Figures

THERMAL TRANSFER COLOR PRINTER AND A METHOD RELATING THERETO

BACKGROUND OF THE INVENTION

The present invention relates to a thermal printing system, and particularly, to a color thermal transfer printer.

A variety of color thermal transfer printing system have been proposed in which a color ink or other record-forming material is selectively transferred from a carrier sheet, such as an ink ribbon, to a record medium (e.g., plain paper or the like) by applying thermal energy to localized areas on the carrier. For example, U.S. Pat. No. 4,250,511 describes a system (FIG. 2) which includes a printhead having a plurality of individual thermal elements that are selectively energized in a timed relationship to transfer a mosaic arrangement of inks arranged on the carrier sheet to a paper as it passes over the printhead. The inks on the carrier include four distinct and different repeating patterns of colors (i.e., three primary colors and black) permitting the formation of multicolor images on the record medium. The images are formed by energizing the appropriate thermal elements as the desired color inks are moved into registration with the elements.

This system, however, has several practical problems. First, due to the use of a mosaic color pattern, circuitry for activating a particular color is very complicated and costly since synchronization is needed, based upon the position of a particular mosaic in two directions for achieving accurate registration. Second, such mosaics are difficult and costly to manufacture. In fact, if high resolution is desired the mosaic color dot spacing must be decreased which increases manufacturing difficulties and cost. Further, the higher resolution desired complicates the synchronization problems discussed above. Third, such mosaics do not permit superimposing of color patterns for creating greater color hues and color ranges.

U.S. Pat. No. 4,250,511 also shows a system (FIG. 4) wherein each discrete respective color area extends transversely along the width of the carrier sheet and the areas are alternately and successively arranged along the length of the carrier. Likewise, this system has several practical problems. First, the carrier sheet moves faster than the record medium; consequently good ink transfer does not occur and smearing is produced resulting in poor resolution. Second, to reduce smearing a smaller transfer force must be provided between the printing head and the record medium; as a result, complete ink transfer is not provided due to inadequate heating. In fact, the transferred ink can frequency bleed off to other surfaces upon its subsequent contact with the record medium.

Another system, shown in U.S. Pat. No. 4,067,017, discloses another system whereby color images are imparted to a rapidly advancing record medium from separate red, green and blue carrier ribbons under the control of three separate elongated assemblages of thermal elements extending across the paper, each corresponding to a respective carrier ribbon. As shown in FIG. 4 of that patent, the ribbons move in a direction transverse to the direction of movement of the record medium. This system, however, has the disadvantage that it is difficult to fully and completely transfer the ink from the ribbons onto the record medium since the paper moves relative to the ribbons. As a result, blurring or smearing of the ink will occur. Another disadvantage is that complicated synchronization is needed based upon the movement of three separate ribbons in one direction and the movement of the paper in another direction. Further, superimposing color patterns for creating greater color hues and color images is complicated.

SUMMARY OF THE INVENTION

It is therefore an object of the invention to provide an improved thermal transfer color printer having a simple and inexpensive construction capable of reproducing multiple color pictures with high quality and resolution.

It is another object of the invention to provide an improved, low cost thermal transfer color printer having a compact size.

It is a further object of the invention to provide a thermal transfer printer permitting larger transfer force, resulting in full transfer of the ink onto the record medium.

It is still a further object of the invention to avoid smearing of the ink during printing and preventing bleeding of the ink upon contact with other surfaces.

According to the invention, a printer includes an elongated thermal printhead and a carrier drive means for transporting a multi-color ink carrier in a first direction and a medium drive means for transporting a record medium, in the same direction and rate, contiguously over the head. The printhead has a row of thermal elements, each of which may be energized to transfer a particular color ink onto the medium as the carrier sheet moves over the head. Various transferable color inks form areas which are arranged in equal color lengths along the length of the carrier sheet. Each respective color area extends transversely along the width of the sheet and are alternately and successively arranged along the length of the carrier sheet. The printhead is selectively forced into contact with the carrier sheet and record medium as they advance at the same rate by means of the carrier and record drive means. The record drive means also transports the record medium sheet in a second direction, opposite to the first direction, one color length while the printhead is disengaged from the carrier and record medium. This permits superimposing of color patterns for creating greater color hues and color ranges. The movement of the record medium in the second direction occurs at a higher rate than the transportation of the record medium in the first direction.

DETAILED DESCRIPTION OF THE PREFERRED EMBODIMENT

Figure 1:
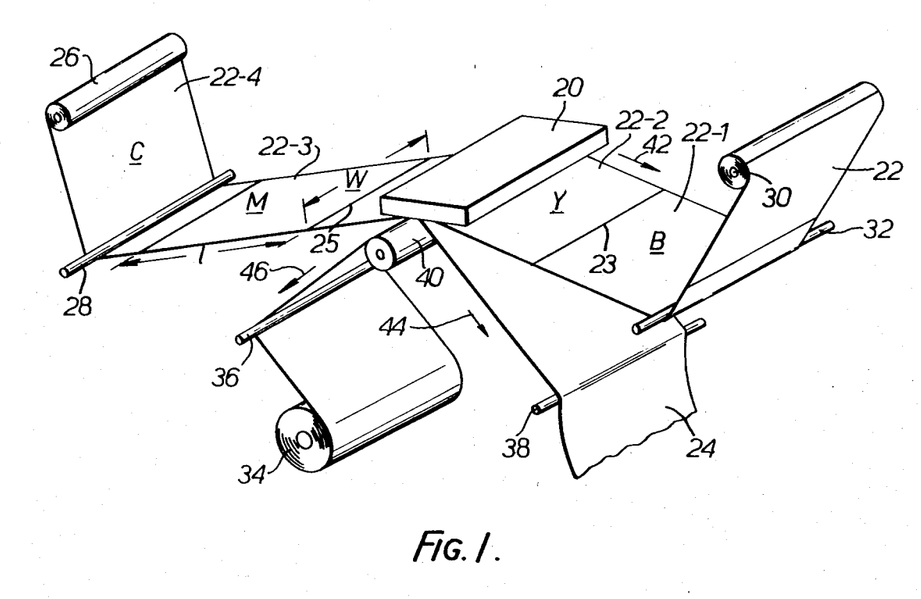
FIG. 1 is a schematic diagram of a thermal transfer color printer in accordance with the present invention.

FIG. 1 is a schematic diagram of the thermal transfer color printer in accordance with the present invention. The printer comprises a thermal printhead 20 having a row of thermal elements (not shown), an ink carrier sheet 22 and a record medium 24 (e.g., paper sheet). Various transferable color inks 22-1, 22-2, 22-3,—are arranged in equal color lengths on a lower surface along the length of carrier sheet 22. Each ink area 22-1, 22-2, 22-3,—has an equal length 1 of approximately 300 mm and a width W of approximately 220 mm. This area defines the maximum printing zone that can be obtained by the printer. For example, color inks 22-1, 22-2, 22-3,—comprise, respectively, black (B), yellow (Y), magneta (M) and cyan (C). Carrier sheet 22 is fed from a supply reel 26 via a first guide roller 28, and passes under printhead 20 is then fed, via a second guide roller 32, to a take-up reel 30. Paper sheet 24 is fed from a paper reel 34 via a third guide roller 36, and passes under printhead 20; it is then feed, via a fourth guide roller 38, to an outlet (not shown).

A platen roller 40 is provided under printhead 40 for receiving both carrier sheet 22 and paper sheet 24 as they are pressed into contact with it by printhead 20 as printing is carried out. Printing occurs while carrier sheet 22 and paper sheet 24 are continguously positioned and advanced at the same rate in a first direction (i.e., forward direction) under the printhead. A printing cycle usually starts when the leading edge 23 of yellow area 22-2 passes under the thermal elements (not shown) of printhead 20 and ends when the trailing edge 25 reaches the thermal elements. At the end of the yellow ink printing, printhead 20 is disengaged from platen roller 40 and only paper sheet 24 is transported backward, in the direction shown by arrow 46 (i.e., a second direction), along the length 1. Then printhead 20 is urged toward platen roller 40 and is selectively forced into contact with sheets 22 and 24; sheets 22 and 24 are then selectively heated by printhead 20. While both sheets advance by length 1, the next color ink, (e.g., magenta (M)), is then transferred onto sheet 24 which contains the yellow color image previously printed during the preceeding printing cycle. By repeating this cycle four times, corresponding to the number of different colors on carrier sheet 22, a complete color image can be obtained. In printing another color image, the paper sheet is advanced forward by the length 1 and the four printing cycles are repeated.

Figure 2:
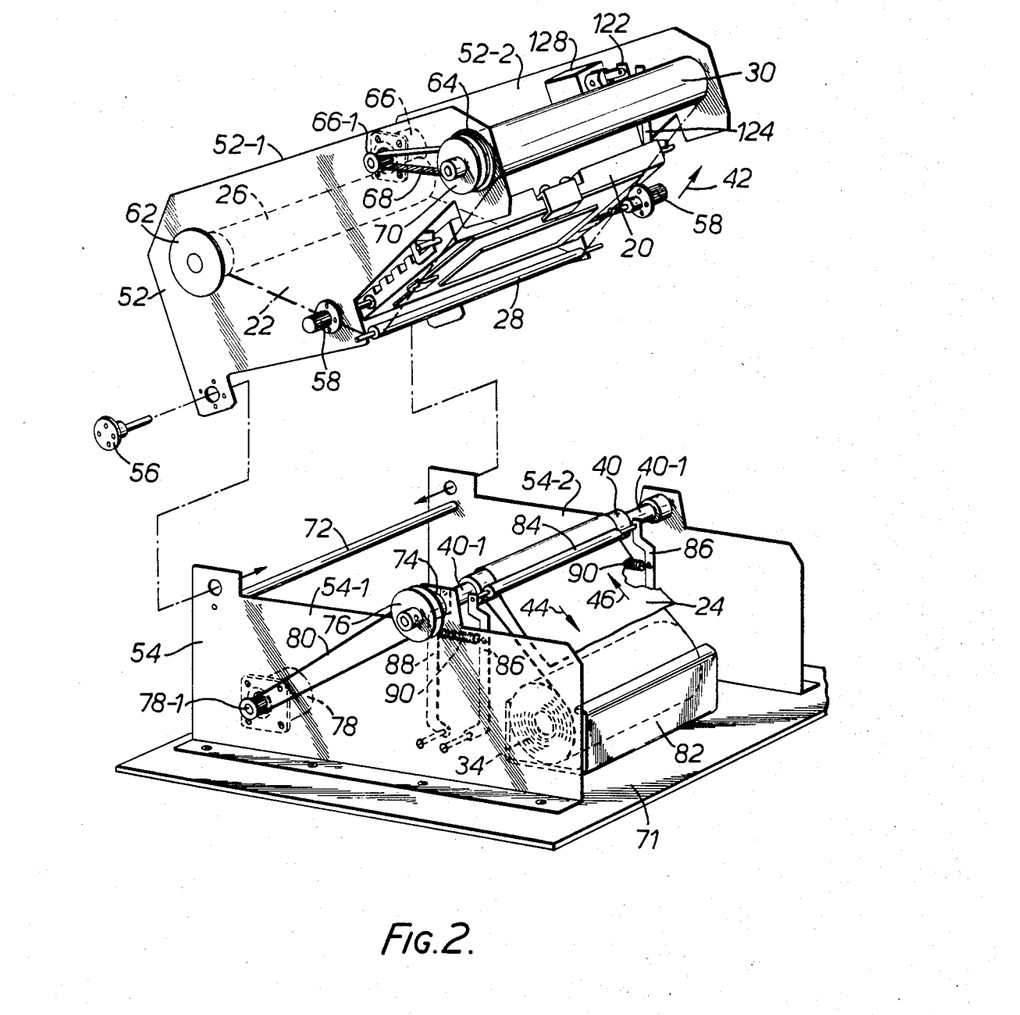
FIG. 2 is a perspective view showing a preferred embodiment of the present invention.

FIG. 2 shows a preferred embodiment of the present invention. Upper support bracket 52 comprising parallel metal walls 52-1, 52-2 and lower support bracket 54 comprising parallel walls 54-1, 54-2 are pivotally connected at their rear portion by a support bracket shaft 56. Thermal printhead 20 is pivotally mounted on upper bracket 52 by printhead bearings 58. Supply reel 26 and take-up reel 30 are rotatably journalled at the rear and front portion of upper bracket 52 by bearings 62 and 64, respectively. Color ink carrier sheet 22 is guided under printhead 20 by guide roller 28 to take-up reel 30 as shown by the dashed line. Take-up reel 30 is driven by a carrier sheet pulse motor 66 which is mounted on metal wall 52-1 of bracket 52. The rotation of pulse motor shaft 66-1 is transmitted by a toothed timing belt 68 which engages take-up sprocket 70 coaxially mounted on a rotating shaft of take-up reel 30. Carrier sheet 22 is thereby transported in a forward direction shown by arrow 42 in FIGS. 1 and 2.

Lower bracket 54 is fixedly attached to a base 71. Parallel metal walls 54-1, 54-2 are bridged by a reinforcing rod 72 for reinforcing the walls. Platen roller 40 is rotatably received at its axis 40-1 by two spaced bearings 74, respectively mounted on metal walls 54-1 and 54-2. A platen sprocket 76 is fixed at one end of axis 40-1 extending through metal wall 54-1. A platen pulse motor 78 is mounted on an inner surface of metal wall 54-1. The rotation of platen motor shaft 78-1 is transmitted by a tooth timing belt 80 which engages sprocket 76.

Figure 4:
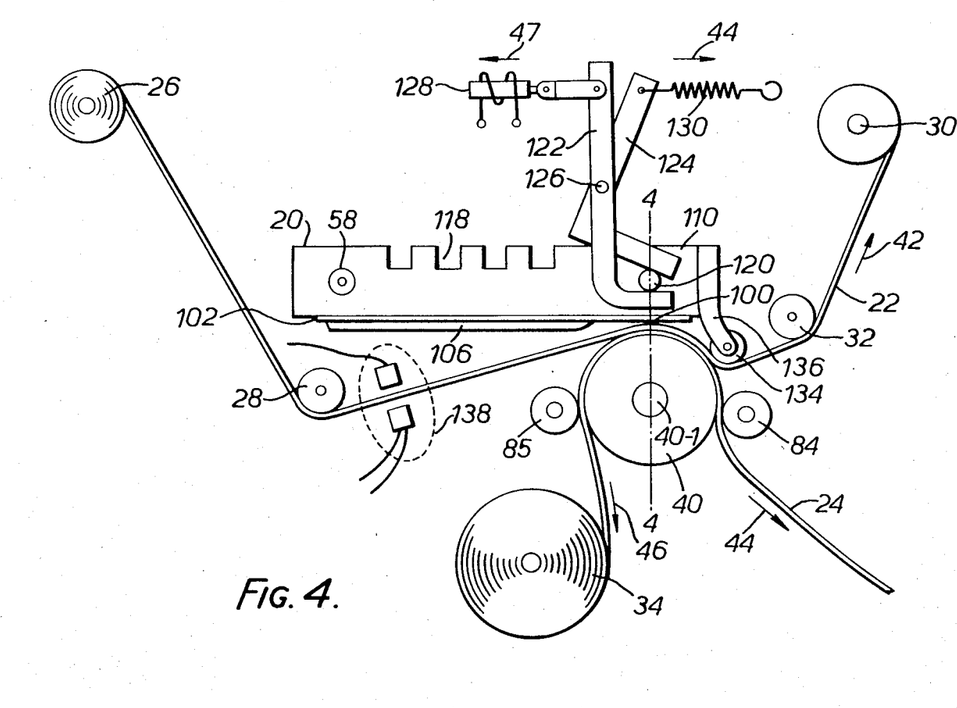
FIG. 4 is a schematic side view showing the printer of the present invention.

Paper reel 34 is received in a container 82. Paper sheet 24 is transported by platen roller 40 in conjunction with a first and second pinch rollers 84 and 85 (pinch roller 85 is not shown in FIG. 2). As shown in FIG. 4, pinch rollers 84 and 85 are positioned in parallel with platen roller shaft 40-1 on each side of the platen roller. Pinch rolers 84 and 85 are rotatably attached to respective pairs of substantially U-shaped arms 86 and 88 which are mounted to each wall 54-1, 54-2 of bracket 54. Arms 86 and 88, at each wall, are connected to each other by a spring 90 so that pinch rollers 84 and 85 urge paper 24 into contact with the surface of platen roller 40. As will be discussed, pulse motor 78 rotates its shaft in both a clockwise and counterclockwise direction in accordance with supplied control signals. Platen roller 40 thereby causes paper sheet 24 to move in both a forward and backward direction as shown by arrows 44 and 46 in FIGS. 1 and 2, respectively.

Figure 3:
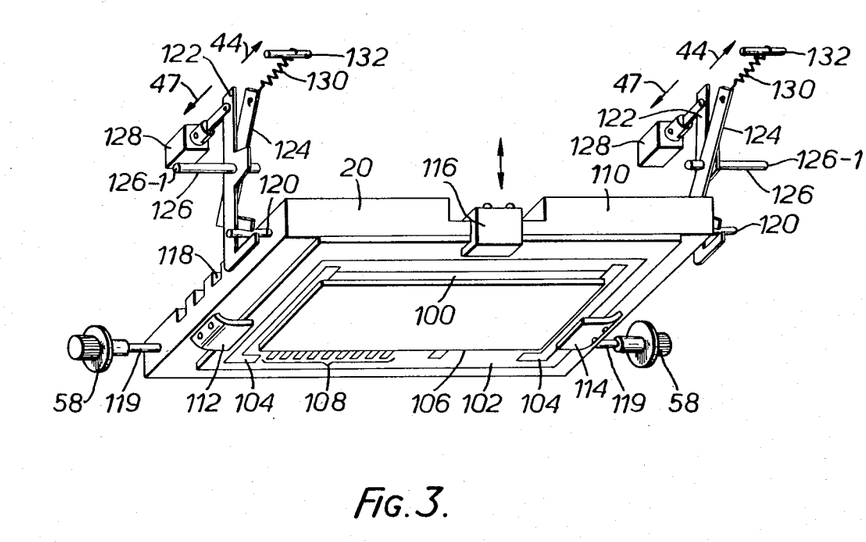
FIG. 3 is a perspective view showing the printhead of FIG. 2.

FIG. 3 shows the thermal printhead of FIG. 2. A row of thermal elements 100 (e.g., electrical resistors) are arranged on a dielectric substrate 102 composed of, for example, ceramic. The row of thermal elements has a length of approximately 215 mm having a density of 8–12 elements per milimeter. Thermal elements 100 are connected at each end to a common terminal 104 which in turn is connected to a drive circuit 106. Drive circuit 106 is an integrated circuit housed in a IC package having a plurality of lead conductors 108 through which data signals and control signals are supplied to the circuit. Dielectric substrate 102 is mounted on a metal plate 110 (e.g., aluminum) by suitable fasteners 112, 114 and 116. A plurality of grooves 118 (FIG. 4) are provided on the remote side of metal plate 110 for radiating heat generated by thermal elements 100.

Metal plate 110 is supported by supporting rods 119 extending from each side wall. Rods 119 outwardly project from the rear portion of the walls and are received by bearings 58 mounted on upper bracket 52 (see FIG. 2). Metal plate 110 is thus supported by upper bracket 52 thereby providing pivotal movement around the axis passing through supporting rods 119.

A pair of pivotal drive rods 120 are positioned at the front of each side wall of metal plate 110. Drive rods 120 are grasped by a pair of spaced first and second L shaped levers 122 and 124, each lever being pivoted at its center portion about a lever pivoting rod 126. The outer end 126-1 of each rod 126 is fixedly attached to the inner surface of its corresponding metal wall 54-1 and 54-2. First levers 122 urge drive rods 120 upwardly. Second levers 124 contact the upper portion of drive rods 120; the upper portions of levers 124 are normally biased forward (see arrows 44) by springs 130 or other biasing means positioned at the end of the vertical arm portion of the lever. The other end of each spring 130 is fixed to the inner surface of its corresponding metal wall 54-1 and 54-2 by pins 132. Therefore, second levers 124 are normally biased in a clockwise direction about lever axis 126 to urge rods 120 downwardly.

FIG. 4 is a side view of the printer according to the present invention whereby the relationship between printhead 56 and ink carrier sheet 22 and paper sheet 24 is schematically shown. In FIG. 4, elements corresponding to those shown in FIGS. 1-3 are given corresponding numbers and a detailed explanation of their operation is accordingly omitted. At the forward end of printhead 20 a third pinch roller 134 is rotatably supported by arms 136. Pinch roller 134 is positioned at the front side of platen roller 40 so that carrier sheet 22 continues to contact the surface of the platen roller for a longer time. This helps provide better transfer of the ink onto the paper and reduces vibration caused by the rotation of take-up reel 30. Pinch roller 134 also acts as a separating roller to help separate the carrier from the paper. Another guide roller 32 is rotatably mounted on the walls of upper bracket 52 for guiding the carrier sheet toward take-up reel 30. A color detector 138 is provided along the path of the carrier sheet between guide roller 28 and platen roller 40.

Printhead 56 is forced toward platen roller 40 with carrier sheet 22 and paper sheet 24 therebetween as printing is carried out. Forcing printhead 56 toward platen roller 40 is caused by springs 130 which rotate second levers 124 and forces drive rods 120 downwardly. As shown in FIG. 4, drive rods 120 and the linear array of thermal elements 100 are positioned along a line 4—4 passing through the center of platen roller 40. Thus, the pressing force of the thermal elements is directed to the surface of the platen roller at its center axes. As previously discussed, carrier sheet 22 and paper sheet 24 are advanced forward, as shown by arrows 42 and 44 at the same rate during printing of each color.

After printing a color (i.e., a printing cycle) solenoid 128 coupled to the upper portion of each lever 122, is energized which causes that portion to move in the rearward direction as shown by arrow 47. As a result, first levers 122 rotate counterclockwise about lever axis 126 by counteracting the force of springs 130 and force drive rods 120 upwardly. The upward force caused by solenoid 128 is sufficiently strong to exceed the downward force provided by spring 130 so that printhead 20 rotates counterclockwise about bearing means 58. This counterclockwise rotation causes thermal elements 100 and third pinch roller 134 to be pulled apart from the surface of platen roller 40 so that carrier sheet 22 and paper sheet 24 can move freely. Thereafter, carrier sheet 22 is transferred forward along the length 1 for printing the next color. Paper sheet 24, on the other hand, is transferred backward (see arrow 46) by the length 1, if the printing cycle is repeated for multicolor printing.

Figure 5:
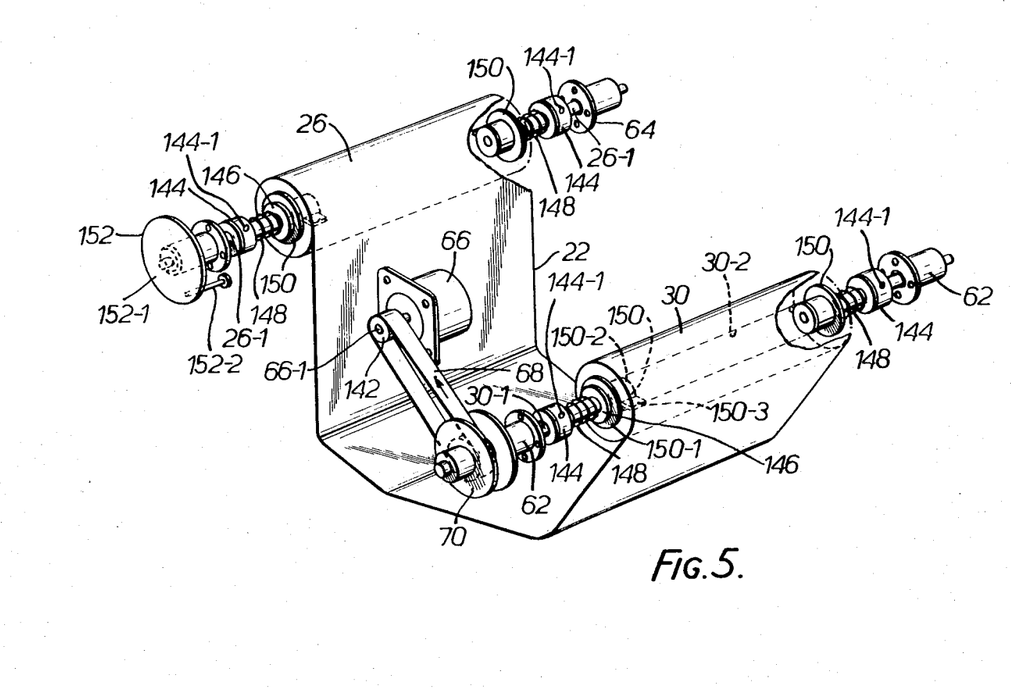
FIG. 5 is a perspective view showing a carrier drive means for transporting the ink carrier sheet shown in FIG. 2.

A more detailed explanation of the color carrier sheet transporting means is made by referring to FIG. 5. A pulse sprocket 142 which engages timing belt 68 is mounted on shaft 66-1 of pulse motor 66. Rotation of shaft 66-1 is transmitted to shaft 30-1 of take-up reel 30 through timing belt 68 which engages with sprocket 70 of take-up reel 30. Shaft 30-1 is journalled in a bearing 62 which is mounted on metal wall 52-1 of the upper bracket (not shown). A stop ring 144 is fixedly attached on rotating shaft 30-1 at a position within upper bracket 52. Stop ring 144 is attached to the shaft by an appropriate adjustable means such as a screw 144-1 so that it may be positioned at different positions along the shaft. A coil spring 148 is coaxially provided on rotating shaft 30-1 adjacent stop ring 144. A friction ring 146 is coaxially provided on rotating shaft 30-1 adjacent coil spring 148. Friction ring 146 is mounted on rotating axis such that it rotates with shaft 30-1 and it is movable along the shaft in response to the force exerted by spring 148.

A carrier cylinder support 150 is rotatably mounted on rotating shaft 30-1 adjacent friction ring 146. Cylinder support 150 comprises a flange 150-1 and an annular body 150-2 having an outwardly projection member 150-3. Annular body 150-2 is removably inserted into one opening of a carrier core cylinder 30-2. Projection 150-3 engages with a slot (not shown) formed on the inner surface of carrier core cylinder 30-2 thereby permitting cylinder support 150 to rotate with carrier core cylinder 30-2. The rotational energy of rotating shaft 30-1 is transmitted to a friction ring 146 and then to cylinder support 150 through a frictional coupling between the surface of friction ring 146 and flange 150-1. By changing the position of stop ring 144 along shaft 30-1 the coupling force between friction ring 146 and cylinder support 150 can be adjusted. The opposite end of core cylinder 30-2 is supported by substantially the same elements mentioned above, except that a friction ring is not employed.

The rotational rate of core cylinder 30-2 decreases as the diameter of the carrier sheet roll wound on the core cylinder increases. An increase in the diameter of the sheet roll will usually produce an increase in circumferential velocity. The friction coupling mechanism, therefore, maintains the transportation rate of the carrier sheet constant while printhead 20 is pressed on the surface of the platen roller.

Supply reel 26 is supported within the upper bracket by substantially similar supporting means to that employed for take-up reel 30. The only difference is that rotating shaft 26-1 on which friction ring 148 is provided is prevented from rotating by a stopper 152. Stopper 152 comprises a disc attached to one end of rotating shaft 26-1 having a projection 152-2, one end of which is fixed to the metal wall of the upper bracket (not shown). Core cylinder 26-2 is rotated by carrier sheet 22 while it is being pulled by takeup reel 30. As the diameter of supply reel 26 decreases while unrolling the carrier sheet, the frictional force between friction ring 148 and flange 150-1 of cylinder support 150 increases. Friction ring 148 acts to provide some braking action to supply reel 26. As a result, ring 148 maintains the transportation of carrier sheet 22 constant irrespective of changes in the diameter of the carrier sheet wound on supply reel 26. Thus, the color ink carrier sheet 22 is transported at a constant rate.

Figure 6:
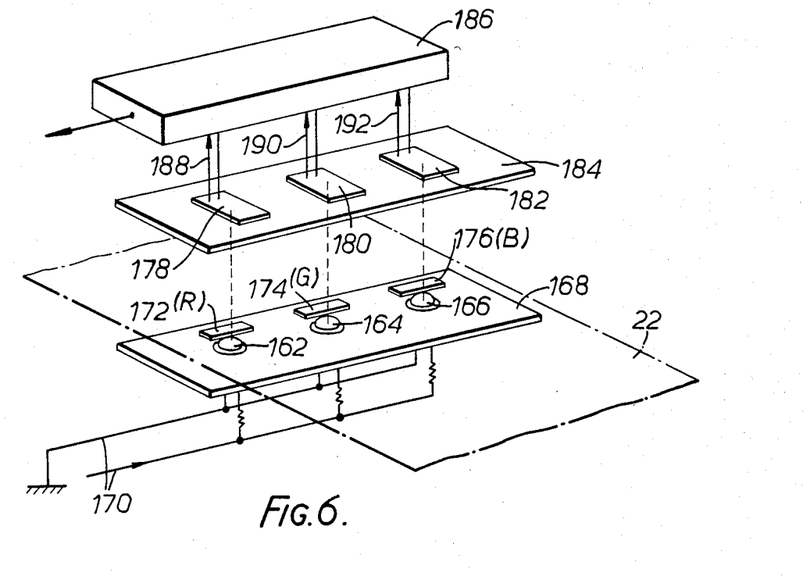
FIG. 6 is a perspective view showing the color detector shown in FIG. 2.
Figure 7:
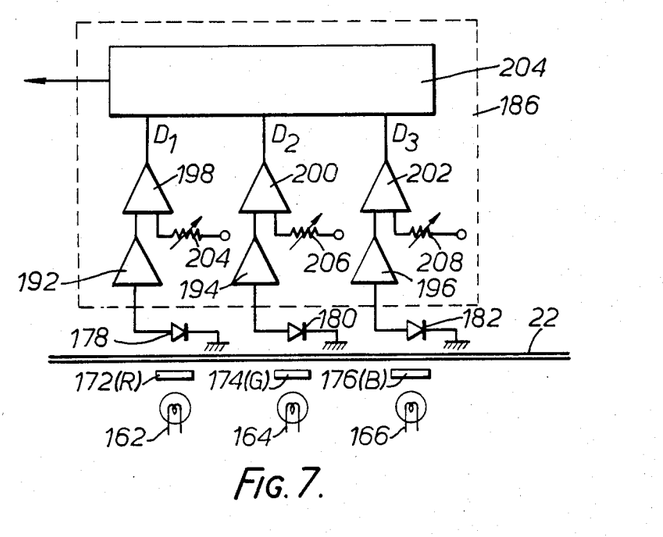
FIG. 7 is a block diagram of the color encoder shown in FIG. 6.

FIG. 6 shows, in more detail, the color detector 138 shown in FIG. 4. Detector 138 contains three lamps 162, 164 and 164 mounted on a board 168 positioned below ink carrier sheet 22. These lamps are arrayed along the width of carrier sheet 22 and are supplied with current through conductors 170. Each lamp is provided with a respective color filter 172, 174 or 176, each passing either red, green or blue light, respectively. Photoelectric converters such as photo transistors 178, 180 and 182 are mounted on a board 184 positioned over carrier sheet 22. Photo transistors 178, 180 and 182 are positioned so as to receive the light emitted from corresponding lamps 162, 164 and 166, respectively. Electric signals generated by each photo transistor are supplied to a signal processing circuit 186 through respective conductors 188, 190 and 192. A block diagram of color detector 138 showing signal processing circuit 186 in more detail is shown in FIG. 7. In this Figure, the same numbers are given to the elements corresponding to those of FIG. 6. As shown, signal processing circuit 186 comprises amplifiers 192, 194 and 196 for amplifying each respective output signal from the photo transistor. The outputs of amplifiers 192, 194 and 196 are supplied to respective comparators 198, 200 and 202. Each respective output signal is compared with a threshold level signal supplied to each comparator through respective variable resistors 204, 206 and 208. Comparator output signals $D_1$, $D_2$ and $D_3$ are digitized and are then temporarily stored in a register 204. The register output data (i.e., $D_1$, $D_2$ and $D_3$) indicates the particular color of the ink on the carrier sheet passing by detector 138.

Detecting the colors on the carrier sheet will now be explained. While passing through the color detector, a yellow ink area on the carrier sheet will pass only red and green light. Red and green light passing through the carrier sheet are received by photo transistors 178 and 182. Thus, the output data $D_1$ and $D_3$ of comparators 198 and 202 will become "1". Since the blue color emitted from filter 174 is prevented from passing through carrier sheet 22, no output signal is obtained from photo transistor 180; therefore, the output data $D_2$ of comparator 200 will be "0". As a result, register 204 stores the following code: (1, 0, 1).

The magenta area on the carrier sheet allows only red and green light to pass. The output signal of comparators 198, 200 and 202 thus become $D_1 = D_2 = 1$ and $D_3 = 0$. When the magenta area passes by the color detector, the output code of the register 204 will be (1, 1, 0). Similarly, when the cyan area passes by the detector, the output data of the comparators become $D_1 = 0$ and $D_2 = D_3 = 1$ and the output data of register 204 will be (0, 1, 1). The black area is similarly detected by detector 138 as (0, 0, 0). The relationship between the ink colors (C, M, Y, B) and comparator output data ($D_1$, $D_2$, $D_3$) is shown by the following table I.

TABLE I

|  | C | M | Y | B |
|---|---|---|---|---|
| $D_1$ | 0 | 1 | 1 | 0 |
| $D_2$ | 1 | 1 | 0 | 0 |
| $D_3$ | 1 | 0 | 1 | 0 |

Figure 8:
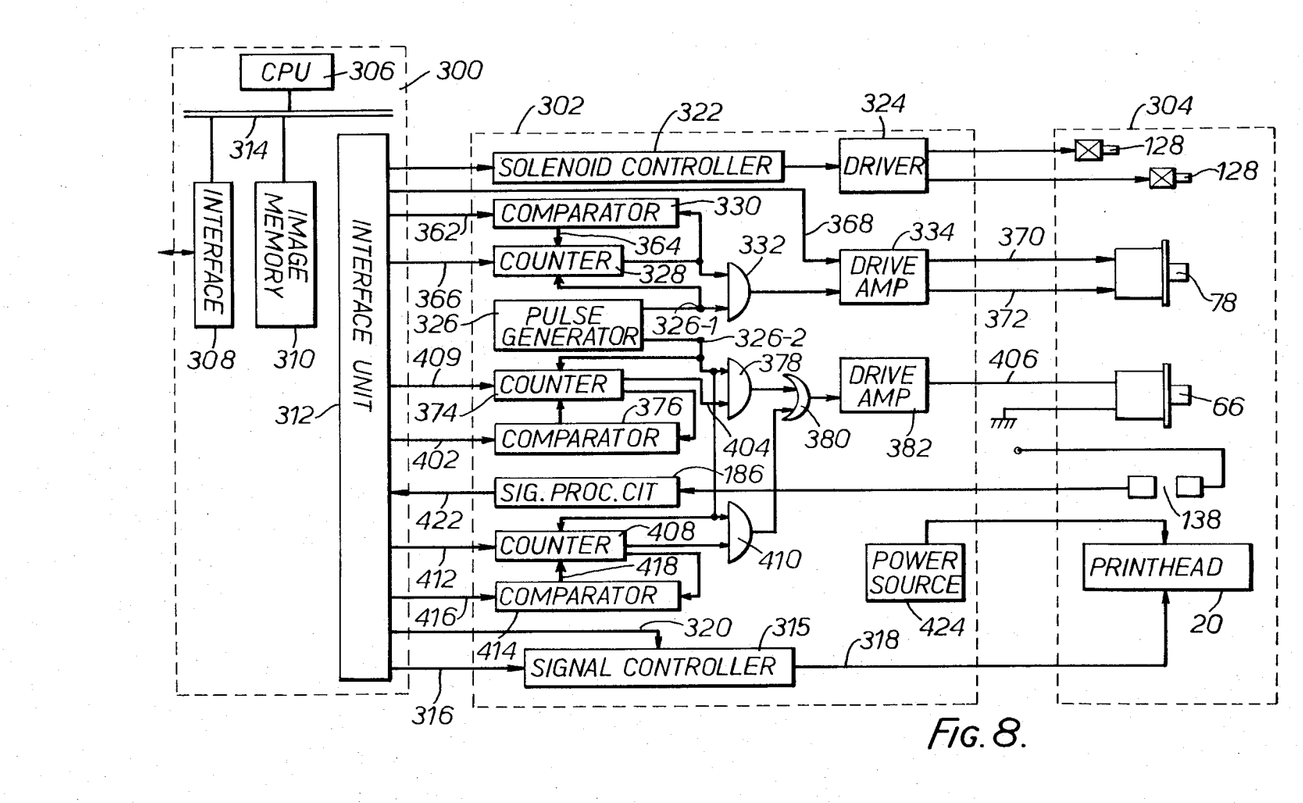
FIG. 8 is a block diagram of an electric control system incorporated in the printer of the present invention.

FIG. 8 shows a block diagram of the electronic control system incorporated in the printer of the present invention. The control system comprises an input-output (I/O) unit 300, a control signal generator 302, and a control unit 304. Control unit 304 includes solenoid 128, pulse motors 66, 78, color detector 138 and thermal printhead 20 which have been previously discussed. I/O unit 300 comprises a micro-computer 306, a first interface unit 308, and image memory 310 and a second interface unit 312, each interconnected by a data bus 314. Under the control of micro-computer 306, digital picture data is supplied to image memoy 310 from an external picture data processor (not shown) via first interface unit 308. The picture data representing the color picture to be printed consists of four categories of color data component signals; that is, the component picture data consists of yellow, magenta, cyan and black. These color data picture components are generated by a conventional picture data processor utilizing conventional techniques known in the fields of graphic display, color television camera facsimile, optical character recognition (OCR), etc. This picture data consists of dot pattern data of the type obtained by raster scanning of a color picture by a photoelectric scanner. As is well known, raster scanning is carried out by horizontally and vertically scanning an object plane upon which the picture patterns are displayed. The output signal thus obtained consists of a series horizontal line signals. The four categories of color component picture data are obtained by raster scanning and digitizing and are supplied to and stored in different memory locations of image memory 310. The picture data stored in image memory 310 are read out under the control of microcomputer 306 through data bus 314 and second interface unit 312 and then supplied to a signal controller 315 through conductor 316. Signal controller 315 supplies the picture data to thermal head printer 20 through a conductor 318. Image control signals for controlling the output of signal controller 315 supplied from microcomputer 306 via second interface 312 and conductor 320.

Figure 9:
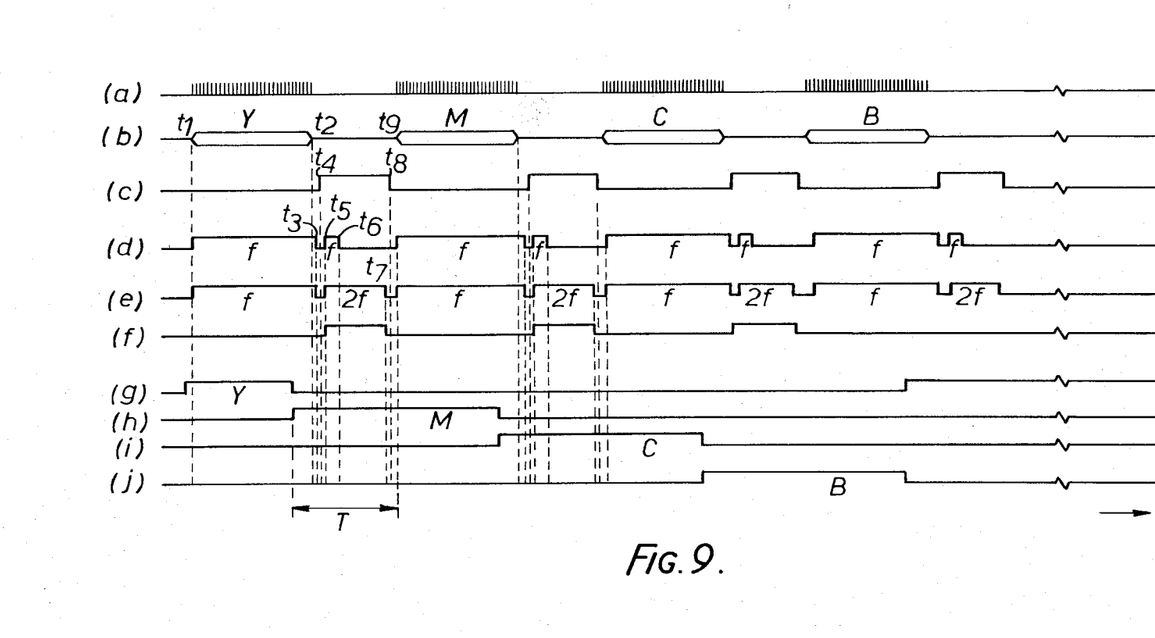
FIG. 9 is a timing diagram showing the timing of the various electrical signals of the central system for operating the printer of the present invention.

The image control signals control signal controller 315 so that each color component data is separately supplied to printhead 20. A diagram of picture data for one color picture is shown in FIG. 9(b). Yellow (Y), magenta (M), cyan (C) and black (B) color component data are sequentially arranged along time axis (t). FIG. 9(a) shows the data clock pulses corresponding to the color component data.

Referring back to FIG. 8, control signal generator unit 302 includes a solenoid controller 322 and a solenoid driver 324. Microcomputer 306 provides solenoid controller 322 with two pulses for energizing solenoid 128. Solenoid controller comprises a flip flop circuit (not shown) which is set by the first pulse and reset by the second pulse. The time $t_4$ and $t_8$, shown in FIG. 9(c), indicate the timing when the first and second pulses are supplied to solenoid controller 322. The output pulse of solenoid controller 322 is amplified by solenoid driver 324. The output pulse of solenoid driver 324 is then supplied to solenoids 128. When energized, solenoids 128 rotate printhead 20 counterclockwise about supporting rods 119 resulting in the disengagement of printhead 20 from platen roller 40, as previously explained. As is clear from FIG. 9, the disengagement of the printhead takes place during the interval of color component data. During the time period when the picture data is supplied, solenoid controller 322 is reset to release solenoid 128; as a result, printhead is forced downwardly by springs 130 so that printhead 20 contacts carrier 22, paper 24 and platen roller 40.

Figure 10:
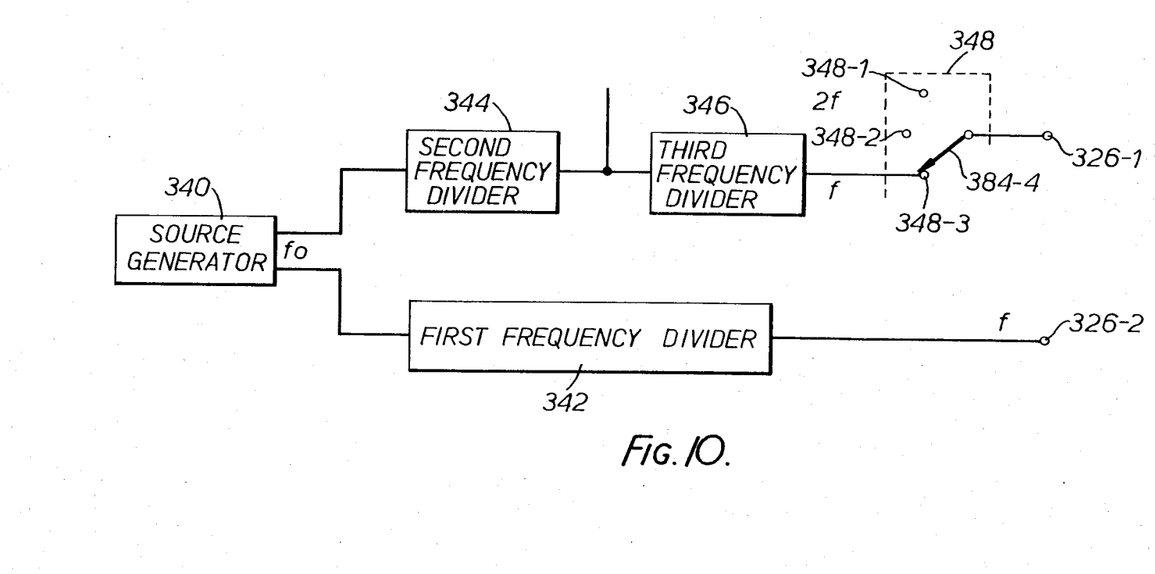
FIG. 10 is a block diagram of the signal generator shown in FIG. 8.

Control signal generator unit 302 further includes control circuits on pulse motors 66 and 78 for driving take-up reel 30 and platen roller 40. The control circuit for pulse motor 78 comprises a pulse generator 326, a counter 328, a comparator 330, an AND gate 332 and a drive amplifier 334. Pulse generator 326 generates two kinds of pulse signals having different frequencies f and 2f. Frequency f, for example, is selected as 500 Hz and frequency 2f is selected as 1 KHz. Pulse generator 326 supplies its first output terminal 326-1 with either pulse signals f or pulse signal 2f, and supplies its second output terminal 326-2 with pulse signal f. As shown in FIG. 10, pulse generator 326 comprises a source generator 340, a first frequency divider 342, a second frequency divider 344, a third frequency driver 346 and switch 348. First frequency divider 342 divides the frequency fo of source generator 340 to produce a frequency f which is supplied at second output terminal 326-2. Second frequency divider 344 divides the frequency fo to produce frequency 2f which is supplied to a first contact 348-1 of switch 348. The output frequency 2f of second divider 344 is also supplied to thrid frequency divider 346 which produces the frequency f. The output frequency f of third divider 346 is supplied to a third contact 348-3 of switch 348. Switch 348 further includes a second contact 348-2 between the first and second contact and a movable contact 348-4 which selectively contacts the first, second or third contact; as a result, movable contact 348-4 supplies first output terminal 326-1 with either pulse signals f or 2f. Although switch 348 is shown as a mechanical switch for explanatory purposes, it can comprise an electronic circuit.

Returning to FIG. 8, the pulse signal from first terminal 326-1 of pulse generator 326 is selectively supplied to either AND gate 322 or to counter 328. Counter 328 counts the pulses supplied from pulse generator 326. The content of counter 328 is supplied via a conductor 328-1 to comparator 330 and is compared with a predetermined value supplied by micro computer 306 through second interface 312 and conductor 362. Comparator 330 controls the operation of counter 328 through a conductor 364. Counter 328 begins counting in response to a start signal from micro-computer 306 through second interface 312 and a conductor 366 and stops counting in response to a stop signal generated by comparator 330 when the content of counter 328 reaches the predetermined value. Counter 328 generates and supplies a gate signal as another input to AND gate 332. Counter 328 generates a gate signal while the counter continues to count pulses supplies by pulse generator 326.

Upon the arrival of the gate signal, AND gate 332 opens and passes the output pulse signal of pulse generator 326 and supplies it to an input of drive amplifier 334. Micro-computer 306 provides driver 334 with a motor control signal through a conductor 368 for indicating the rotational direction of pulse motor 78. Drive amplifier 334 amplifies the motor control signal and the output pulse signals of pulse generator 326 and supplies the amplified output signal to pulse motor 78 via conductors 370 and 372, respectively.

The control circuit of pulse motor 66 comprises pulse generator 326, a counter 374, a comparator 376, AND gate 378, OR gate 380 and a drive amplifier 382. This control circuit has a construction similar to the control circuit of pulse motor 78. Pulse signals having a frequency f from output terminal 326-2 are supplied to both counter 274 and AND gate 378. Counter 374 begins counting the pulses from generator 326 in response to a signal from micro-computer 306 through second interface unit 312 and a conductor 400. Counter 374 stops counting when in response to a signal from comparator 376 it reaches a predetermined value. Counter 374 generates a gate control signal and supplies it to AND gate 378 through a conductor 404 while counter 374 is counting the input pulses. The output pulse signal from generator 326 is supplied to drive amplifier 382 through AND gate 378 and OR gate 380. Drive amplifier 382 amplifies the input signals and supplies it to pulse motor 66 via a conductor 406.

The output pulse from second output terminal 326-2 is also provided to a counter 408 and AND gate 410. Counter 408 begins counting the pulses in response to a signal from micro-computer 412. Comparator 414 compares the contents of counter 408 with a predetermined value supplied by micro-computer 306 via a conductor 416. Counter 408 stops counting when a signal is supplied from comparator 414 through a conductor 418 when the content of counter 408 reaches the predetermined value. Counter 408 supplies a gate control signal through a conductor 420 to AND gate 410 to open the gate while counter 408 continues to count pulses from pulse generator 326. The output pulse from pulse generator 326 passes through AND gate 410 and OR gate 380 and drives amplifier 382.

The output signals from signal processing circuit 186 of color detector 138 is supplied to micro-computer 306 through a conductor 422 and a second interface unit 312. A power source 424 for thermal printhead 20 is provided within control signal generator unit 302.

The operation of the motor control circuits will be explained with reference to the timing diagram of FIG. 9. FIG. 9(d) shows the timing during which pulse signals having a frequency f are supplied to pulse motor 66. At time $t_1$ when the yellow color component signal Y begins, counter 374 begins counting the output pulses f from output terminal 236-2 of pulse generator 326 which are simultaneously supplies to pulse motor 66 through AND gate 380, OR gate 378 and drive amplifier 382. Output pulse signal f continues to be supplied to pulse motor 66 after time $t_2$, when color signal Y ends. At time $t_3$ pulse signal f ends since comparator 376 terminates the operation of counter 374 when its content reaches the predetermined value. At time $t_5$, counter 408 beings to count the output pulses f from pulse generator 326 which are simultaneously supplied to pulse motor 66 through AND gate 410, OR gate 378 and drive amplifier 382. Pulse signal f continues to be supplied to the motor at time $t_6$ when the operation of counter 408 is terminated by comparator 414. Beginning from time $t_9$, the magenta color component signal M undergoes the same operational cycle that occurred for the Y signal during the time $t_1$ to $t_9$.

FIG. 9(e) shows the timing during which pulse signals having frequencies f and 2f are supplied to pulse motor 78. At the time $t_1$, counter 328 begins to count the output pulses f from output terminal 326-1 of pulse generator 326 which are simultaneously supplied to pulse motor 78 through AND gate 332, drive amplifier 334 and conductor 372. The output signal having frequency f continues to be supplied to the pulse motor at time $t_3$ which is determined by comparator 330 as mentioned above. During the time period $t_1$–$t_3$, the motor control signal supplied to pulse motor 78 from the micro-computer via conductors 368 and 370 remains at a low level, as shown in FIG. 9(f). Under the control of this signal, pulse motor 78 rotates its shaft such that paper sheet 24 is transported in the forward direction. At time $t_5$, the motor control signal changes to a high level which lasts until time $t_7$. During the time period $t_5$–$t_7$, a pulse signal having a frequency 2f is supplied from first output terminal 326-1 of pulse generator 326 to pulse motor 78 through AND gate 332, drive amplifier 334 and conductor 372. Pulse motor 78 rotates its shaft in the reverse direction at a rate two times as fast as its rate in the forward direction. By this revere rotation, paper sheet 24 is transported backward at twice the transportation rate that occurred in the forward direction.

Operation of the printer according to the present invention will now be explained. As shown in FIG. 2, upper bracket 52 can be pivoted upwardly about bearing 56. Ink carrier sheet 22 is connected between supply reel 26 and take-up reel 30. In particular, core cylinder 26-2 (FIG. 6) upon which ink carrier sheet 22 is wound is loaded between cylinder supports 150 and held in place by the action of springs 148. Carrier sheet 22 is pulled out from supply reel 26 and is fed to take-up reel 30 by passing under guide roller 28, third pinch roller 134 (FIG. 4) and guide roller 32. The leading edge of carrier sheet 22 can be attached to core cylinder 30-2 (FIG. 5) by using an adhesive, for example. Core cylinder 30-2, upon which carrier sheet 22 is wound, may be removed from cylinder supports 150 by disengaging the cylinder supports from core cylinder 30-2. Within lower bracket 54, a paper roll 34 is placed in container 82 and paper sheet 24 is fed out passing around platen roller 40 while being pressed by pinch roller pair 84, 85. The leading edge of sheet 24 is fed out to the front side of lower bracket 54.

After positioning ink carrier sheet 22 and paper sheet 24 within the upper and lower bracket housings, the upper bracket is pivoted downwardly toward the lower bracket in a horizontal position. Upper bracket is then locked to the lower bracket by an appropriate locking means (not shown).

Figure 11A:
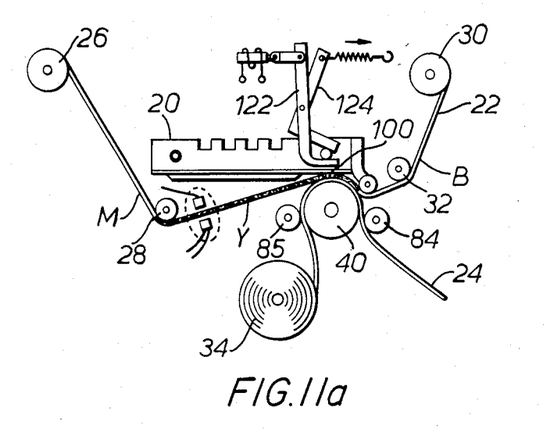
FIGS. 11a–11d are side views showing the sequential operation of the printer according to the present invention.
Figure 11B:
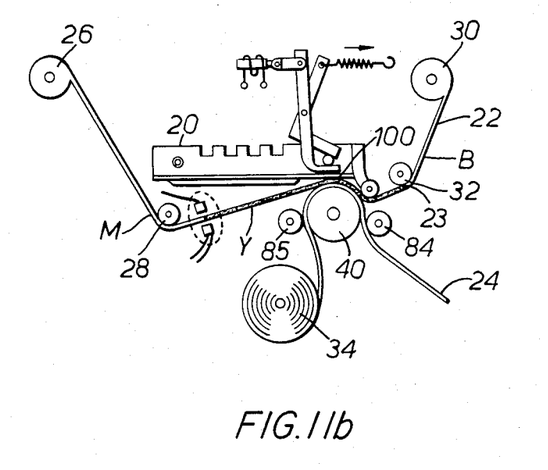
Figure 11C:
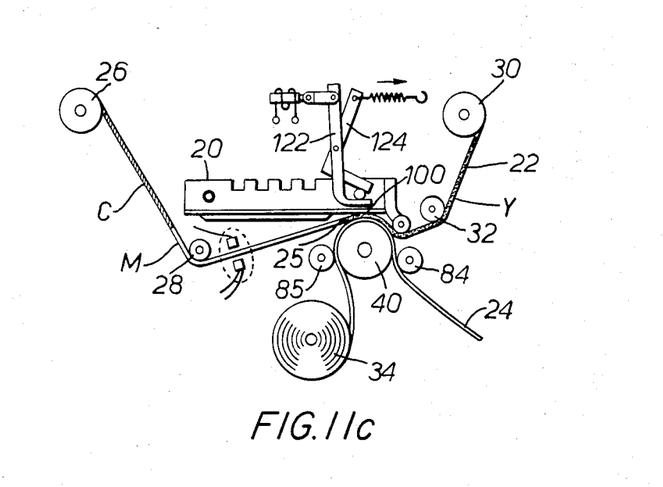
Figure 11D:
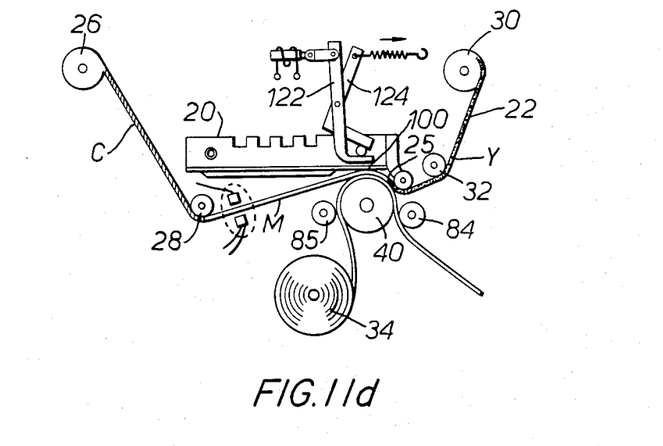

As shown in FIGS. 9(a) and (b), yellow color component signal Y is supplied to thermal printhead 20 through the drive circuit beginning at time $t_1$. Simultaneously, pulse signals are supplied to pulse motors 66 and 78 for driving take-up reel 30 and platen roller 40 as respectively shown in FIGS. 9(d) and (e). Ink carrier sheet 22 and paper sheet 24 advance contiguously along the surface of the platen roller 40 until the time $t_2$. During the time $t_1$–$t_2$, the thermal elements 100 (FIGS. 3, 4) heat the ink carrier sheet in response to the color component signals. Being heated, the ink is melted and adheres to the paper sheet. The color component signal is supplied to thermal printhead 20 when the corresponding color ink area on the carrier sheet is positioned under the thermal element array 100. FIG. 11(a) shows the state in which yellow color in area Y is positioned under the thermal array and printing occurs in response to the yellow color signal. Printing beings a short time after the leading edge (FIG. 1) of the yellow ink area Y reaches a position just beyond thermal elements 100 as shown in FIG. 11(a). Pulse motor 66 and 78 are driven by pulse signals until the time $t_3$ (see FIG. 9). While printing is carried out, carrier sheet 22 and paper sheet continguously advance at the same rate along the surface of platen roller 40 and are guided by third pinch roller 134. After passing pinch roller 134, the carrier sheet is separated from the paper sheet and is then wound by take-up reel 30, as shown in FIG. 11(b). At time $t_4$, the solenoid control signal (FIG. 9(c)) from solenoid controller 322 changes from a low level to a high level. As a result, solenoid 128 is actuated causing printhead 20 to be lifted upward by first levers 122. While printhead 20 is lifted, pulse motor 78 further drives take-up reel 30 during the time $t_5$ to $t_6$; motor 78 is supplied with pulse signals of frequency f so that the leading edge 25 (FIG. 1) of the next ink area M reaches a position just beyond the thermal element array 100 as shown in FIGS. 11(c) and (d) for performing the next printing cycle. The timing $t_5$ and $t_6$ is determined by micro-computer 306 in response to the output code from signal processing circuit 18 of color detector 138. FIGS. 9(g)–(j) show timing diagrams of each color ink area passes the color detector. Since color detector 138 is placed rearwardly of printhead 20, there is a time difference T between the time when a leading edge of any one color component is detected and when it reaches just beyond the thermal element array (see FIG. 11(a)). The timing $t_5$ and $t_6$ are therefore determined by taking this time difference into consideration.

The motor control signal supplied to pulse motor 66 changes its level from low to high at time $t_5$ which causes to motor to reverse its rotation. Pulse generator 326 (FIG. 8) supplies a pulse signal of frequency 2f from first output terminal 326-1 during the time period $t_5$–$t_7$ which is approximately half the time period of $t_1$–$t_2$. During this time period paper sheet 24 is transported backward at a rate two times as fast as the rate of its forward transportion. Paper sheet 24 is transported backward until the leading edge printed by the immediately preceding color component signal (i.e., "yellow") returns to a position where the immediately preceding printing began (see FIG. 11(d)).

The output signal from solenoid controller 322 changes its level from high to low at time $t_8$, as shown in FIG. 9(c). Printhead 20 thus returns to the horizontal position, shown in FIG. 11(d). Magenta signal M is supplied to printhead 20 at time $t_9$ (see FIG. 9(b)). The same operation mentioned above for printing by the yellow signal occurs for the remaining color component signals to permit complete color printing of the image.

According to the embodiments of the present invention, many advantages are obtained, some of which are as follows:

(i) Loading of the ink carrier sheet and paper sheet can be easily performed since they are accommodated in separate bracket housings, coupled together by pivot means;

(ii) Shrinkage of the ink carrier sheet can be avoided since it is transported by a supply reel and takeup reel having friction coupling which maintains the transportation rate of the carrier sheet constant irrespective of diameter variations of either reel;

(iii) Strict manufacturing control of the position of each carier ink area on the sheet is not required since the leading edge of each area is detected by a color detector and printing begains when the leading edge of the detected area is positioned just beyond the thermal element array;

(iv) High quality color printing can be obtained since ink transfer occurs while the carrier sheet and the paper sheet continguously advance at the same rate. Moreover, since the thermal elements are force toward the surface of the platen roller at its center axis, heat transfer from the elements to the ink carrier sheet and the paper sheet is optimized. Further, since the carrier sheet is separated from the paper sheet after a sufficient time has elapsed for the ink to be completely transferred to the paper, blurring and ink stains are avoided; and (v) The printed image size can be easily altered by electronically controlling the color picture signals to be printed.

Although illustrative embodiments of the invention have been described in detail with reference to the accompanying drawings, it is to be understood that invention is not limited to those precise embodiments and that various changes and modifications may be effected therein by one skilled in the art without departing from the scope or spirit of the invention.

I claim:

1. A thermal transfer color printer for printing a color image comprising:
   a thermal printhead having a linear array of thermal elements which are selectively energized by color component electrical signal representing the color image to be printed;
   a color carrier sheet supported for movement across said printhead in a direction substantially perpendicular to said array, with one face of the sheet being positioned in heat transfer relationship with said thermal elements, said carrier sheet having a plurality of different color-record forming materials, each material alternatively and successively distributed in areas arranged along said perpendicular direction;
   a record medium sheet supported on the opposite face of said carrier sheet for movement along said perpendicular direction;
   means for selectively forcing said carrier sheet and record medium sheet in contact with said printhead for thermally transferring said color materials from the carrier sheet onto the record medium when said thermal elements are energized;
   a carrier sheet drive means for transporting said carrier sheet in a direction along said perpendicular direction while the carrier sheet and record medium contact said printhead;
   a record medium drive means for transporting said record medium in said first direction at substantially the same rate as said carrier sheet printhead, said record medium drive means also including means for transporting said record medium in a second direction, opposite to said first direction while the carrier sheet and record medium are disengaged from said printhead; and
   separating means for separating said carrier sheet from said record medium while said carrier sheet and said record medium are transported in said second direction.

2. A thermal transfer color printer according to claim 1, wherein each of said areas defines the maximum printing zone of said printer having a width W which is substantially equal to said carrier sheet and a length 1.

3. A thermal transfer color printer of claim 2, wherein said color materials comprise: yellow, magenta and cyan.

4. A thermal transfer color printer of claim 3, wherein said record medium sheet is a paper sheet.

5. A thermal transfer color printer of claim 4, wherein said paper sheet has a width substantially equal to the width of said carrier sheet, paper sheet being supported for movement in the direction of its length.

6. A thermal transfer color printer of claim 5, wherein said carrier sheet drive means further comprises:
   a supply reel containing said carrier sheet and for supplying said carrier sheet to said thermal elements;
   a take-up reel for receiving said carrier sheet supplied from said supply reel; and
   a carrier drive motor for driving said take-up reel and transporting said carrier sheet in the first direction.

7. A thermal transfer color printer of claim 6, wherein said record medium drive means further comprises:
   a platen roller rotatably supported at a position adjacent said printhead;
   two pinch rollers, each rotatably supported adjacent said platen roller at opposite sides thereof, for pressing said paper sheet against the surface of said platen roller; and
   a platen drive motor for driving said platen roller and for transporting said paper sheet in both the first or second directions.

8. A thermal transfer color printer of claim 7 wherein said means for selectively forcing said carrier sheet and record medium sheet into contact with said printhead further comprises:
   a support plate for supporting said printhead on a surface opposite to said platen roller;
   a pivoting means for pivotally supporting said support plate;
   a support plate controlling means for moving said support plate about said pivot means between a first position wherein said thermal elements are forced into contact with said carrier sheet and paper sheet and a second position wherein said carrier sheet and paper sheet are disengaged from said printhead.

9. A thermal transfer color printer 8, wherein said supply reel and take-up reel are rotatably supported by a friction coupling for transporting said carrier sheet at a constant rate irrespective of diameter variation of the carrier sheet wound on said reels.

10. The thermal transfer color printer of claim 9, wherein said printer further includes an electronic control system for controlling the operation of said printing comprising:
    a support plate circuit means coupled to said support plate controlling means, for energizing said support plate controlling means for moving said support plate between the first and second positions;
    carrier control circuit means coupled to said carrier drive motor, for controlling said carrier drive motor to transfer said carrier sheet in the first direction substantially along the length 1 while said support plate is in said first position;
    platen control circuit means coupled to said platen pulse motor for controlling said platen pulse motor to transfer said carrier sheet in the first direction substantially along the length 1 while said support plate is in said first position; and
    said platen circuit means further including means for causing said platen pulse motor to transfer said carrier sheet in the second direction substantially along the length 1 while said support plate is in said second position.

11. A thermal transfer color printer of claim 10, wherein said electronic control system further comprises:
    an image memory for storing a plurality of color component signal constituting the color image to be printed;
    a signal controller for providing separate categories of said color component signals to said printhead for energizing said thermal elements, each of said color component signals being supplied to said printhead during separate printing cycles while said carrier sheet and paper sheet are transported in the first direction.

12. A thermal transfer color printer of claim 11, wherein each category of color component signals corresponds to a separate color ink.

13. A method of printing color images utilizing thermal printing comprising the steps of:

transporting a color carrier sheet in a first direction along the direction of its length, said carrier sheet having a plurality of different color-record forming materials, each material alternately and successively distributed in color areas arranged along said direction;

transporting a record medium sheet in said direction at a rate substantially equal to a rate of said carrier sheet;

pressing a thermal printhead to said carrier sheet and record medium sheet while they are moving in said first direction, said printhead having a linear array of thermal elements arrayed in a direction substantially perpendicular to the direction of carrier sheet length;

supplying a first category of a plurality of color component signals to said printhead for energizing said thermal elements and thermally transferring one of the color forming materials on the carrier sheet onto the record medium sheet, each color component signal category corresponding to a respective color of said color forming materials;

transporting said carrier sheet and record medium sheet together in the first direction at substantially the same rate while said printhead is pressed to said carrier sheet and record medium sheet;

transporting said record medium sheet in a second direction, opposite to said first direction, while said printhead is disengaged from said record medium sheet; and supplying a second category of color component signals to said printhead for thermally transferring another different coloring forming material on the carrier sheet to the record medium sheet.

14. A method of printing according to claim 13, wherein the step of transporting the record medium sheet in the second direction occurs along a length of one color area and at a higher rate than the transportation of the record medium sheet in the first direction.

* * * * *